(12) United States Patent
Berger et al.

(10) Patent No.: US 10,323,443 B2
(45) Date of Patent: Jun. 18, 2019

(54) CLOSURE SYSTEM FOR A VEHICLE

(71) Applicant: GM GLOBAL TECHNOLOGY OPERATIONS LLC, Detroit, MI (US)

(72) Inventors: Richard A. Berger, Sterling Heights, MI (US); David C. Caples, Whitmore Lake, MI (US); Jeffrey L. Konchan, Romeo, MI (US)

(73) Assignee: GM Global Technolgy Operations LLC., Detroit, MI (US)

( * ) Notice: Subject to any disclaimer, the term of this patent is extended or adjusted under 35 U.S.C. 154(b) by 1022 days.

(21) Appl. No.: 14/690,879

(22) Filed: Apr. 20, 2015

(65) Prior Publication Data

US 2016/0305170 A1 Oct. 20, 2016

(51) Int. Cl.
*E05B 81/20* (2014.01)
*E05B 77/38* (2014.01)
(Continued)

(52) U.S. Cl.
CPC ............... *E05B 81/20* (2013.01); *B60J 10/80* (2016.02); *E05B 77/38* (2013.01); *E05B 2047/0033* (2013.01)

(58) Field of Classification Search
CPC .. E05B 17/0025; E05B 17/0029; E05B 77/36; E05B 77/38; E05B 81/20; E05B 83/18; B60J 10/80; B60J 10/85; B60J 10/84; B60J 10/50; B60J 10/86; B60J 10/87; Y10T 292/03; Y10T 292/1093; Y10T 292/1043; Y10T 292/1075; Y10T 292/1077; Y10T 292/1082; Y10T 292/20;
(Continued)

(56) References Cited

U.S. PATENT DOCUMENTS 3,151,698 A * 10/1964 Pollock ................... E05B 77/12
                                                        16/DIG. 32
4,046,082 A * 9/1977 Tedesco ................... F16J 13/18
                                                        105/377.01
(Continued)

FOREIGN PATENT DOCUMENTS

CN 101180442 A 5/2008
CN 101624025 A 1/2010
(Continued)

*Primary Examiner* — Christine M Mills
(74) *Attorney, Agent, or Firm* — Quinn IP Law

(57) ABSTRACT

A vehicle includes a first member and a second member moveable relative to the first member. A compliant member is compressible between the first member and the second member. A compression control device is attached to one of the first member and the second member for engaging another of the first member and the second member, or the compliant member. The compression control device is moveable between a first position and a second position. When disposed in the first position, the compression control device is not engaged with the first member, the second member, or the compliant member, and allows compression of the compliant member into a first compressive state. When disposed in the second position, the compression control device is engaged with one of the first member, the second member, or the compliant member, and is operable to compress the compliant member into a second compressive state.

19 Claims, 3 Drawing Sheets

(51) Int. Cl.
  *B60J 10/80* (2016.01)
  *E05B 47/00* (2006.01)
(58) Field of Classification Search
  CPC ............. Y10T 292/225; Y10T 292/202; Y10T 292/205; Y10T 292/212; Y10T 292/48; Y10T 292/481; Y10S 292/71; Y10S 292/73; Y10S 292/42; Y10S 292/14
  USPC ... 292/1, 211, 194, 195, 197, 201, 256, 257, 292/256.5, 256.6, 256.65, 307 R, 308, 292/DIG. 71, DIG. 73, DIG. 42, DIG. 14; 296/146.9, 224
  See application file for complete search history.

(56) References Cited

U.S. PATENT DOCUMENTS

| | | | | |
|---|---|---|---|---|
| 4,057,020 A * | 11/1977 | Halliar | ..................... | F16J 13/18 105/377.11 |
| 4,154,474 A * | 5/1979 | Hough | ................... | B60J 7/1642 296/218 |
| 4,483,557 A * | 11/1984 | Pastva | ................. | E05B 15/0245 292/218 |
| 4,893,849 A * | 1/1990 | Schlack | .............. | E05B 17/0025 292/66 |
| 5,280,973 A * | 1/1994 | Culling | ............... | E05B 17/0025 292/342 |
| 7,478,845 B2 * | 1/2009 | Mankame | ........... | E05B 47/0009 292/201 |
| 7,874,609 B2 * | 1/2011 | Whinnery | ................ | E05B 81/20 292/110 |
| 8,123,278 B1 * | 2/2012 | McKenney | ............ | B60J 5/0479 296/146.9 |
| 8,196,992 B2 * | 6/2012 | Konchan | ................ | B60J 5/0479 296/146.9 |
| 8,328,268 B2 * | 12/2012 | Charnesky | ............ | B60J 5/0479 277/644 |
| 8,328,269 B2 * | 12/2012 | Krajenke | ............ | B60R 13/0243 296/146.1 |
| 8,342,592 B2 * | 1/2013 | Konchan | ................ | B60J 5/0479 16/334 |
| 8,484,900 B2 * | 7/2013 | Charnesky | ............ | B60J 5/0479 296/146.9 |
| 8,485,586 B2 * | 7/2013 | Netherland, III | ...... | B60J 5/0479 296/146.4 |
| 8,607,505 B2 * | 12/2013 | Bazzi | ..................... | B60J 5/0479 296/146.9 |
| 8,657,361 B2 * | 2/2014 | Charnesky | ............... | B60J 10/86 296/146.2 |
| 8,777,295 B2 * | 7/2014 | Charnesky | ............ | B60J 5/0477 296/146.4 |
| 2002/0063440 A1 * | 5/2002 | Spurr | ...................... | E05B 63/14 296/146.9 |
| 2007/0056231 A1 * | 3/2007 | DiMario | ................... | B60J 1/00 52/204.53 |
| 2012/0056450 A1 * | 3/2012 | DiMario | ................ | B60J 1/006 296/224 |

FOREIGN PATENT DOCUMENTS

| | | | | |
|---|---|---|---|---|
| CN | 102345420 A | 2/2012 | | |
| CN | 102536034 A | 7/2012 | | |
| CN | 102951214 A | 3/2013 | | |
| EP | 2400086 A2 | 12/2011 | | |
| EP | 2845973 A2 | 3/2015 | | |
| FR | 2971289 A1 * | 8/2012 | ............. | E04B 9/003 |
| GB | 2418953 A * | 4/2006 | ............... | E05C 9/06 |
| JP | 2013019215 A | 1/2013 | | |

* cited by examiner

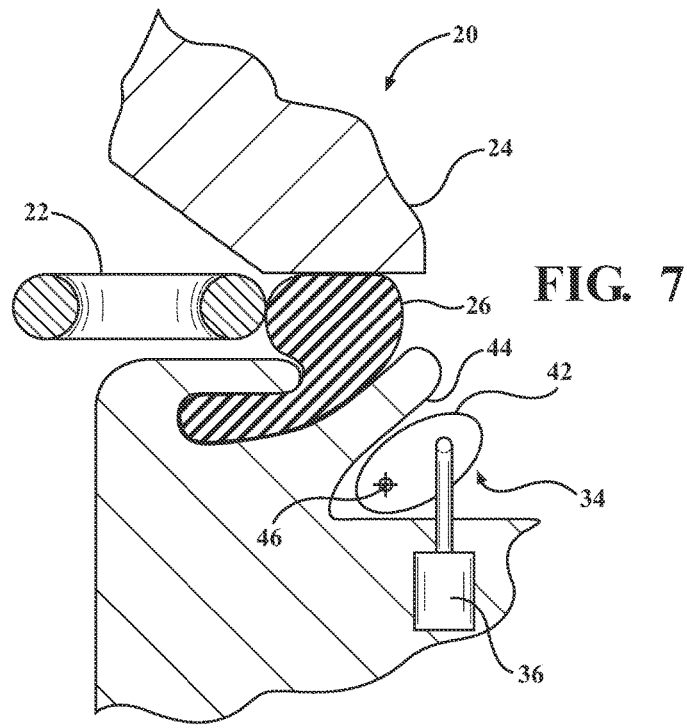
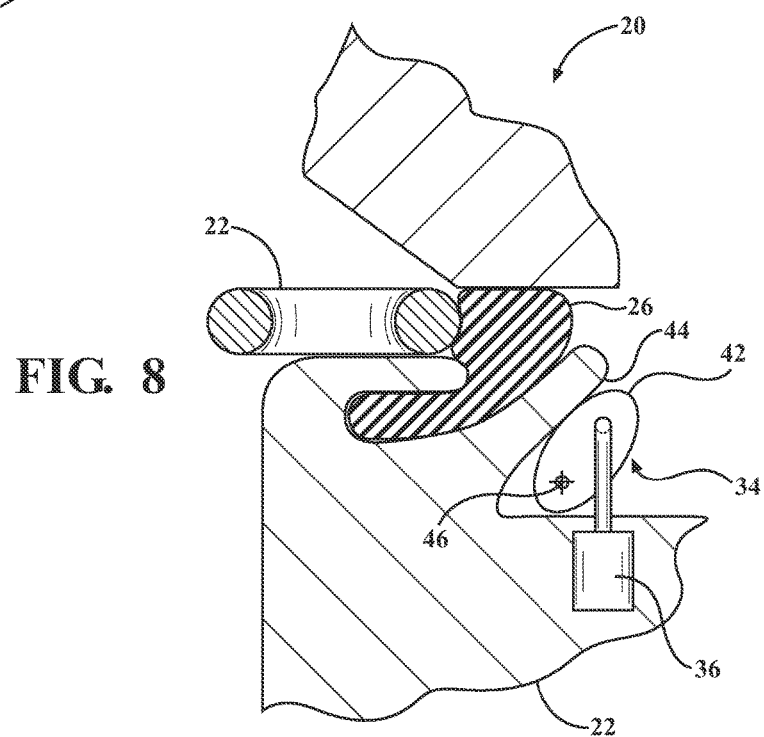

CLOSURE SYSTEM FOR A VEHICLE

TECHNICAL FIELD

The disclosure generally relates to a closure system for a vehicle.

BACKGROUND

A latch system latches a first member of a vehicle to a second member of the vehicle. For example, the latch system may latch a decklid to a body of the vehicle, or a door to the body of the vehicle. Often, a compliant member is disposed between the first member and the second member. For example, the compliant member may include a seal disposed between the decklid and the body, or a rubber bumper disposed between the door and a latch striker on the body. The compliant member maintains a certain amount of compressibility, even when the first member and the second member are latched together. This compressibility of the compliant member allows relative movement between the first member and the second member, even when they are latched together.

SUMMARY

A closure system for a vehicle is provided. The closure system includes a first member and a second member moveable relative to the first member, between an open position and a closed position. A compliant member is attached to one of the first member and the second member. The compliant member is compressible between the first member and the second member. A latch system is operable to selectively latch the second member and the first member together when the second member is disposed in the closed position. A compression control device is attached to one of the first member and the second member. The compression control device is operable to engage another of the first member and the second member, or the compliant member. The compression control device is moveable between a first position and a second position. When disposed in the first position, the compression control device is not engaged with the first member, the second member, or the compliant member. When disposed in the first position, the compression control device allows compression of the compliant member into a first compressive state. When disposed in the second position, with the first member and the second member latched together, the compression control device is engaged with one of the first member, the second member, or the compliant member, and is operable to compress the compliant member into a second compressive state.

A vehicle is also provided. The vehicle includes a first member and a second member moveable relative to the first member between an open position and a closed position. A compliant member is attached to one of the first member and the second member, and is compressible between the first member and the second member. A compression control device is attached to one of the first member and the second member, and is operable to engage another of the first member and the second member, or the compliant member. The compression control device includes a cam surface, and one of the first member and the second member include a cam follower for engagement with the cam surface. An actuator is coupled to the compression control device for moving the compression control device between a first position and a second position. When the compression control device is disposed in the first position, in which the cam follower is not engaged with the cam surface, the compression control device is configured to allow compression of the compliant member into a first compressive state. When the first member and the second member are latched together, and the compression control device is disposed in the second position, in which the cam follower is engaged with the cam surface, the compression control device is configured to compress the compliant member into a second compressive state.

Accordingly, the compression control device controls the compressibility of the compliant member, when the first member and the second member are latched together. When disposed in the second position, the compression control device maintains the compliant member in the second compressive state, to control the compressibility of the compliant member. By controlling the compressibility of the compliant member, and limiting the compliant member to the second compressive state, relative movement between the first member and the second member may be controlled when the first member and the second member are latched together.

The above features and advantages and other features and advantages of the present teachings are readily apparent from the following detailed description of the best modes for carrying out the teachings when taken in connection with the accompanying drawings.

BRIEF DESCRIPTION OF THE DRAWINGS

FIG. 7 is a schematic cross sectional view of an alternative embodiment of the closure system, showing a vehicular door in a closed position, and a fourth alternative embodiment of the compression control device in the first position.

FIG. 8 is a schematic cross sectional view of the alternative embodiment of the closure system, showing the vehicular door in the closed position, and the fourth alternative embodiment of the compression control device in the second position.

DETAILED DESCRIPTION

Figure 1:
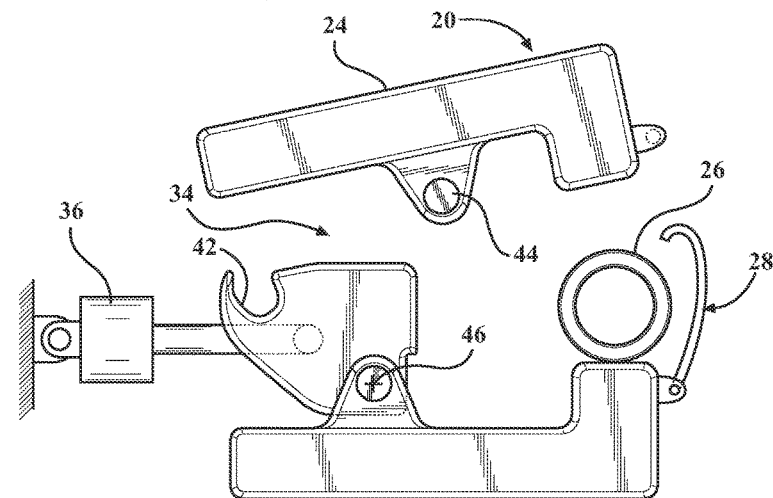
FIG. 1 is a schematic plan view of a closure system for a vehicle, showing a first embodiment of a compression control device, and a second member of the vehicle in an open position.

Those having ordinary skill in the art will recognize that terms such as "above," "below," "upward," "downward,"

"top," "bottom," etc., are used descriptively for the figures, and do not represent limitations on the scope of the disclosure, as defined by the appended claims. Furthermore, the teachings may be described herein in terms of functional and/or logical block components and/or various processing steps. It should be realized that such block components may be comprised of any number of hardware, software, and/or firmware components configured to perform the specified functions.

Referring to the Figures, wherein like numerals indicate like parts throughout the several views, a closure system for a vehicle is generally shown at 20. The closure system 20 includes a first member 22, and a second member 24. The second member 24 is moveable relative to the first member 22, between an open position and a closed position. The first member 22 and the second member 24 may include any two components of the vehicle that move between an open and closed position relative to each other. For example, and as shown in FIGS. 1-6, the first member 22 is defined as a body of the vehicle, and the second member 24 is defined as a decklid of the vehicle. As shown in FIGS. 7 and 8, the first member 22 is defined as a striker that is attached to the body of the vehicle, and the second member 24 is defined as a door of the vehicle.

A compliant member 26 is attached to one of the first member 22 or the second member 24. The compliant member 26 is compressible between the first member 22 and the second member 24. The compliant member 26 exhibits a compliance. Compliance is defined herein as the tendency to deform or yield in response to an applied load 32. Compliance may be considered the reciprocal of stiffness. As shown in the exemplary embodiments of FIGS. 1-6, the compliant member 26 is a seal disposed between the decklid and the body, and is operable to seal therebetween. As shown in the exemplary embodiment of FIGS. 7 and 8, the compliant member 26 is a bumper that is attached to the door. The bumper is designed to absorb energy transfer between the door and the striker, to protect against closing the door with excessive force, i.e., over-slam, and to reduce relative movement between the door and the body.

Figure 2:
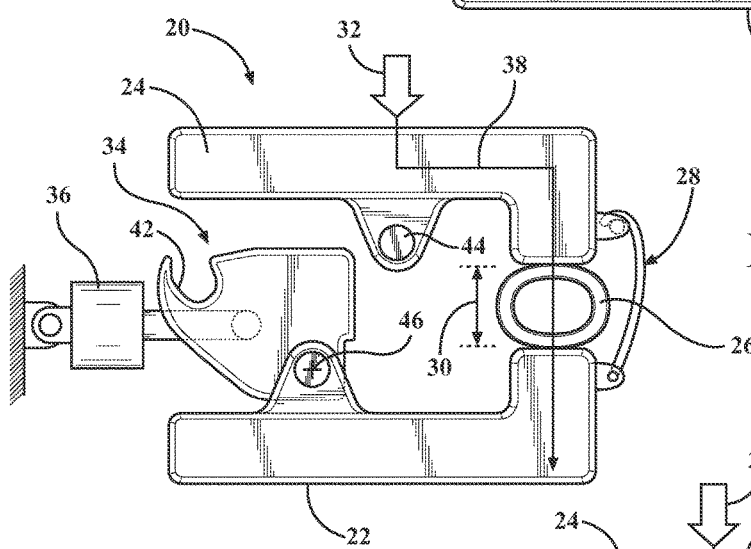
FIG. 2 is a schematic plan view of the closure system, showing the second member in a closed position, and the first embodiment of the compression control device in a first position.
Figure 4:
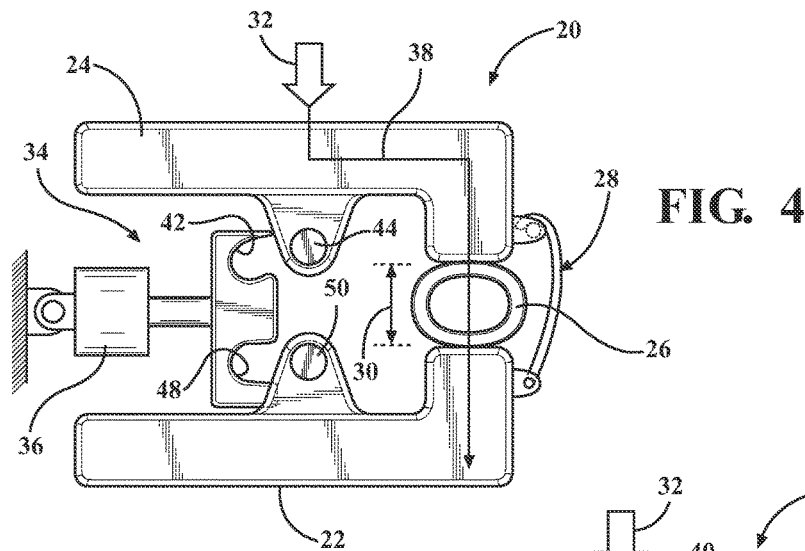
FIG. 4 is a schematic plan view of the closure system, showing the second member in the closed position, and a second embodiment of the compression control device in the first position.

The closure system 20 includes a latch system 28. The latch system 28 is operable to selectively latch the second member 24 and the first member 22 together, when the second member 24 is disposed in its respective closed position. FIG. 1 shows the second member 24 disposed in its respective open position, with the latch system 28 disengaged. FIGS. 2 and 4 show the second member 24 disposed in its respective closed position, with the latch system 28 engaged to latch the second member 24 to the first member 22. The latch system 28 may include any suitable style and/or configuration of latch mechanism capable of connecting the second member 24 and the first member 22, and suitable for use in a vehicle. Typically, the latch system 28 includes a fork bolt that releasably grasps a wire loop, such as the striker, i.e., the first member 22 shown in the exemplary embodiment of FIGS. 7 and 8. The specific configuration and operation of the latch system 28 are not pertinent to the scope of the disclosure, and are known to those skilled in the art. As such, the specifics of the latch system 28 are not described in detail herein.

While the latch system 28 latches the first member 22 and the second member 24 together, and prevents the second member 24 from opening when engaged, i.e., moving into the open position, it should be appreciated that the latch system 28 does not overly compress the compliant member 26, and does not prevent all relative movement between the first member 22 and the second member 24. When the latch system 28 is engaged, with the second member 24 latched to the first member 22, the compliant member 26 is compressed into an initial state of compression, such as shown in FIG. 2. The compliant member 26 may be slightly compressed when in this initial state of compression, but may be further compressed with the application of an additional load 32. When the compliant member 26 is disposed in the initial state of compression, as shown in FIG. 2, the first member 22 and the second member 24 may be spaced from each other to define an initial gap 30. Because the compliant member 26 remains compressible, even when the latch system 28 is engaged to latch the second member 24 to the first member 22, a load 32 applied to the second member 24 may still cause movement between the second member 24 and the first member 22, by further compressing the compliant member 26. It should be appreciated that a change in the compression of the compliant member 26 is directly related to a change in the gap 30 between the first member 22 and the second member 24. As such, as the compression of the compliant member 26 is increased, the gap 30 between the first member 22 and the second member 24 decreases. Similarly, as the compression of the compliant member 26 decreases, the gap 30 between the first member 22 and the second member 24 increases, up until the compliant member 26 reaches the initial state of compression at the initial gap 30.

A compression control device 34 is attached to one of the first member 22 or the second member 24. The compression control device 34 is operable to engage another of the first member 22 and the second member 24, or the compliant member 26. Accordingly, if the compression control device 34 is attached to the first member 22, then the compression control device 34 may be operable to engage either the second member 24 or the compliant member 26. Alternatively, if the compression control device 34 is attached to the second member 24, then the compression control device 34 may be operable to engage either the first member 22 or the compliant member 26. As shown in the exemplary embodiments of FIGS. 1-6, the compression control device 34 is attached to the first member 22, and is operable to engage the second member 24. As shown in the exemplary embodiment of FIGS. 7 and 8, the compression control device 34 is attached to the second member 24, and is operable to engage the compliant member 26.

The closure system 20 includes an actuator 36 that is coupled to the compression control device 34. The actuator 36 is operable to move the compression control device 34 between a first position, such as shown in FIGS. 1, 2, 4 and 7, and a second position, such as shown in FIGS. 3, 5, 6 and 8. The actuator 36 may include an electric motor, pneumatic or hydraulic piston 56, or some other device capable of moving the compression control device 34. When the compression control device 34 is disposed in the first position, the compression control device 34 allows compression of the compliant member 26 into a first compressive state. When the compression control device 34 is disposed in the second position, the compression control device 34 compresses the compliant member 26 into a second compressive state. The compression control device 34 may be disposed in the first position when the vehicle is stopped, and may be disposed in second position when the vehicle is moving, with the first member 22 and the second member 24 latched together by the latch system 28. It should be noted that the compression control device 34 is separate from the latch system 28. Accordingly, the performance of the latch system 28 to latch the second member 24 to the first member 22 is not directly related to the performance of the compression control device 34 to compress the compliant member 26 into the second compressive state. As such, the compression control device 34 may be actuated independently of the latch system 28, and is not directly related to the operation of the latch system 28.

As noted above, in the exemplary embodiment of the closure system 20 shown in FIGS. 1-6, the first member 22 is defined as the body of the vehicle, and the second member 24 is defined as the decklid. Within the exemplary embodiment shown in FIGS. 1-6, when the compression control device 34 is disposed in the first position, a load 32 applied to the second member 24 is transferred through a first load path 38, shown in FIGS. 2 and 4, to the first member 22 through the compliant member 26. Because the compression control device 34 is disposed in the first position, the compliant member 26 is free to compress into the first compressive state. Compression of the compliant member 26 in the first compressive state is dependent upon a magnitude of the load 32 applied to the second member 24, and thereby applied to the compliant member 26. An increase in the load 32 applied to the second member 24 increases the force that is transferred to the first member 22 through the compliant member 26. An increase in the load 32 to the compliant member 26 increases the compression of the compliant member 26. As the load 32 applied to the second member 24 fluctuates, such as may happen with a load 32 generated by an aerodynamic downforce, the compression of the compliant member 26 will vary. As the compression of the compliant member 26 changes, i.e., either increases or decreases, the gap 30 between the first member 22 and the second member 24 across the compliant member 26 will change, thereby causing the second member 24 to move relative to the first member 22.

Figure 3:
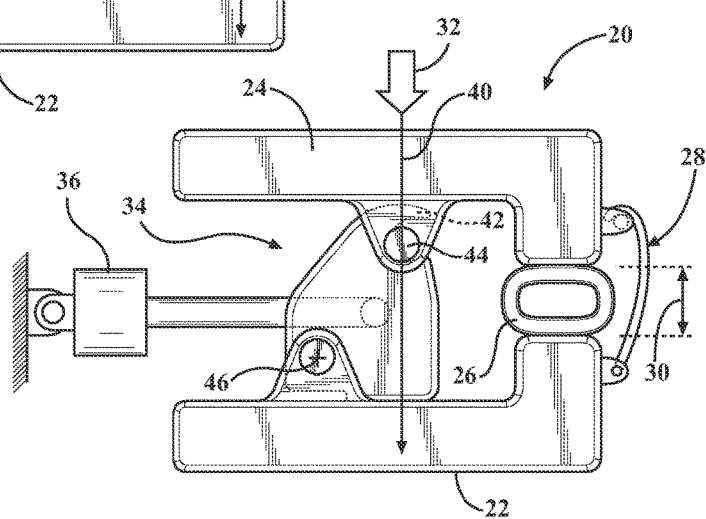
FIG. 3 is a schematic plan view of the closure system, showing the second member in the closed position, and the first embodiment of the compression control device in a second position.
Figure 5:
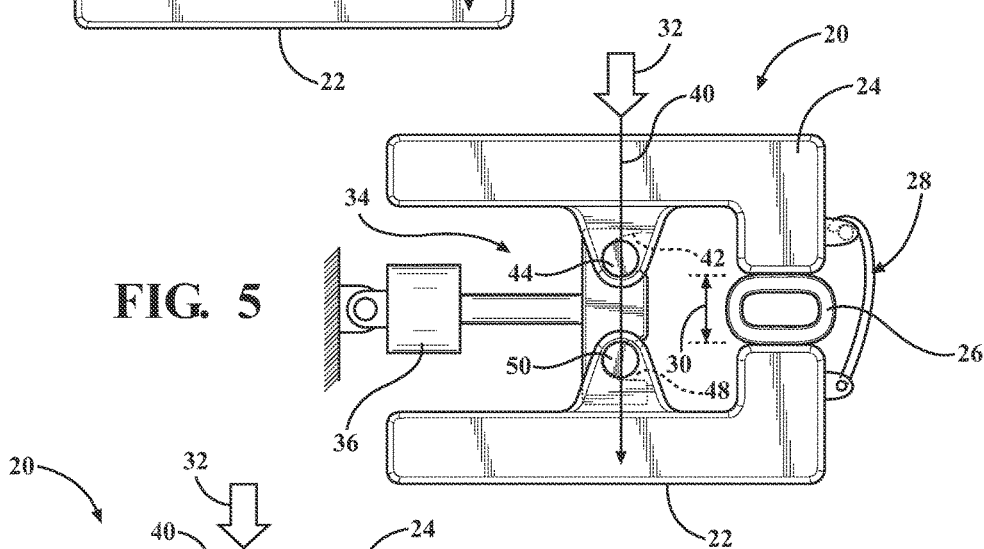
FIG. 5 is a schematic plan view of the closure system, showing the second member in the closed position, and the second embodiment of the compression control device in the second position.
Figure 6:
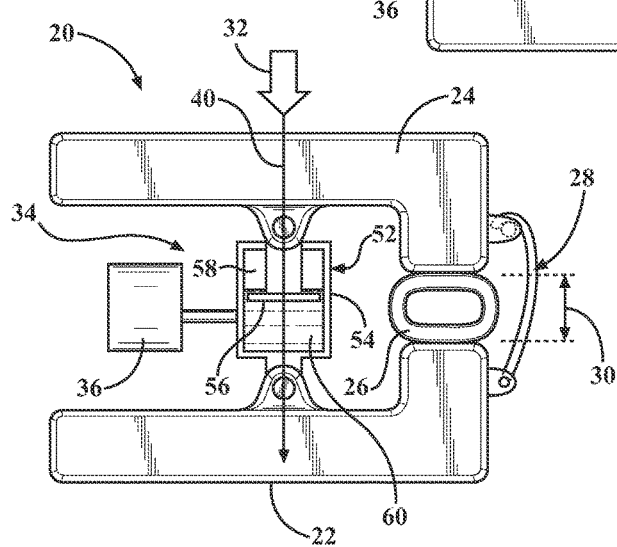
FIG. 6 is a schematic plan view of the closure system, showing the second member in the closed position, and a third embodiment of the compression control device in the second position.

Within the exemplary embodiment shown in FIGS. 1-6, when the compression control device 34 is disposed in the second position, such as shown in FIGS. 3, 5, and 6, the compression control device 34 mechanically connects the first member 22 and the second member 24, and provides a substantially unyielding connection between the first member 22 and the second member 24. When disposed in the second position, the compression control device 34 provides a direct, second load path 40, generally shown in FIGS. 3 and 5, between the first member 22 and the second member 24 to transfer a load 32 applied to the second member 24 to the first member 22, and bypass load 32 transfer through the compliant member 26. Accordingly, a load 32 applied to the second member 24, such as an aerodynamic downforce, is directly transferred through the compression control device 34 to the first member 22, and is not transferred through the compliant member 26. When the compression control device 34 is disposed in the second position, compression of the compliant member 26 in the second compressive state is substantially fixed, and is not dependent upon a magnitude of the load 32 applied to the second member 24. As such, the second compressive state is a generally fixed compressive state that does not change and/or vary with a change in the load 32 applied to the second member 24. It should be appreciated that the compression of the compliant member 26 at the first compressive state is higher or greater than the compression of the compliant member 26 at the second compressive state.

As shown in FIGS. 1-5, and 7-8 the compression control device 34 includes a cam surface 42, and one of the first member 22 and the second member 24 include a cam follower 44 for engagement with the cam surface 42. As shown in the exemplary embodiment of FIGS. 1-5, the second member 24, i.e., the decklid, includes the cam follower 44. It should be appreciated that the relative positions of the cam surface 42 and the cam follower 44 may be reversed, such that the second member 24 includes the cam surface 42, and the compression control device 34 includes the cam follower 44. As shown in the exemplary embodiment of FIGS. 7 and 8, the second member 24, i.e., the door, includes the cam follower 44, and the compression control device 34 includes the cam surface 42.

As shown in FIGS. 1-3, and 7-8, the compression control device 34 is rotatably moveable about an axis 46 between the first position and the second position. The actuator 36 is coupled to the compression control device 34 in such a manner as to cause the compression control device 34 to rotate about the axis 46.

Referring to FIGS. 1-3, the actuator 36 causes the compression control device 34 to rotate from the first position, shown in FIGS. 1 and 2, into the second position shown in FIG. 3. As the cam follower 44 located on the second member 24 engages the cam surface 42 on the compression control device 34, the cam surface 42 urges the cam follower 44 downward toward the first member 22, until the cam follower 44 bottoms out on the cam surface 42 when the compression control device 34 is disposed in the second position. Movement of the second member 24, caused by the interaction between the cam follower 44 and the cam surface 42, moves the compliant member 26 into the second compressive state. A load 32 applied to the second member 24, is directed along the second load path 40 through the compression control device 34, between the first member 22 and the second member 24, with the load 32 to the compliant member 26 remaining substantially constant, and the compression of the compliant member 26 also remaining substantially constant.

Referring to FIGS. 4-5, the actuator 36 causes the compression control device 34 to move linearly, between the first position, shown in FIG. 4, and the second position, shown in FIG. 5. As noted above, the compression control device 34 includes the cam surface 42, and the second member 24 includes the cam follower 44. Additionally, in the embodiment of the closure system 20 shown in FIGS. 4-5, the compression control device 34 includes a slot 48, and the first member 22 includes a rod 50. As the actuator 36 moves the compression control device 34 in a linear direction toward the cam follower 44 and the rod 50, the cam follower 44 located on the second member 24 engages the cam surface 42 on the compression control device 34, and the rod 50 on the first member 22 engages the slot 48 on the compression control device 34. The cam surface 42 urges the cam follower 44 downward toward the first member 22, until the cam follower 44 bottoms out on the cam surface 42 when the compression control device 34 is disposed in the second position. Additionally, when the compression control device 34 is disposed in the second position, the rod 50 is interlocked with the slot 48 to prevent vertical movement in a direction perpendicular to a long axis of the slot 48. Movement of the second member 24, caused by the interaction between the cam follower 44 and the cam surface 42, moves the compliant member 26 into the second compressive state. A load 32 applied to the second member 24, is directed along the second load path 40 through the compression control device 34, between the first member 22 and the second member 24, with the load 32 to the compliant member 26 remaining substantially constant, and the compression of the compliant member 26 also remaining substantially constant.

Referring to FIG. 6, the compression control device 34 includes a magnetorheological fluid coupling or damper 52. A magnetorheological (MR) fluid 60 is a type of smart fluid in a carrier fluid. The carrier fluid is usually a type of oil. When subjected to a magnetic field, the smart fluid greatly increases its apparent viscosity, to the point of becoming a viscoelastic solid. The MR damper 52 includes a housing 54 that is attached to the first member 22, and a piston 56 that is attached to the second member 24. The MR fluid 60 and a portion of the piston 56 of the MR damper 52 are disposed within an interior 58 of the housing 54 of the MR damper 52. When the second member 24 of the closure assembly is positioned such that the compliant member 26 is in the second compressive state, a magnetic control signal is applied to the MR fluid 60, to turn the MR fluid 60 into a viscoelastic solid, and substantially preventing the movement of the piston 56 relative to the housing 54. A load 32 applied to the second member 24, is directed along the second load path 40 through the compression control device 34, between the first member 22 and the second member 24, with the load 32 to the compliant member 26 remaining substantially constant, and the compression of the compliant member 26 also remaining substantially constant.

As noted above in the exemplary embodiment of the closure system 20 shown in FIGS. 7 and 8, the first member 22 is defined as the striker on the vehicle, the second member 24 is defined as the door of the vehicle, and the compliant member 26 is defined as a bumper for contacting the striker when the door is closed. As shown in FIG. 7, in which the compression control device 34 is disposed in the first position, the compliant member 26 is shown contacting the first member 22, and compressed into the first compressive state. The actuator 36 causes the compression control device 34 to rotate about the axis 46, causing the cam surface 42 on the compression control device 34 to contact the cam follower 44 on the second member 24, which is in direct contact with and supports the compliant member 26. As the compression control device 34 rotates, the cam follower 44 follows the cam surface 42, thereby compressing the compliant member 26 against the striker into the second compressive state. It should be appreciated that the second compressive state of this exemplary embodiment is a higher or greater compressive state than the first compressive state of this embodiment. By so doing, the compression of the bumper, i.e., the compliant member 26 is increased towards a maximum compression level, such that a load 32 applied to the door, i.e., the second member 24, is unable to further compress the compliant member 26, and the relative movement between the first member 22 and the second member 24 is reduced.

The detailed description and the drawings or figures are supportive and descriptive of the disclosure, but the scope of the disclosure is defined solely by the claims. While some of the best modes and other embodiments for carrying out the claimed teachings have been described in detail, various alternative designs and embodiments exist for practicing the disclosure defined in the appended claims.

The invention claimed is:

1. A closure system for a vehicle, the closure system comprising:
a first member;
a second member moveable relative to the first member;
a compliant member attached to one of the first member and the second member, and compressible between the first member and the second member;
a latch system moveable between an engaged position to selectively latch the second member and the first member together, and a disengaged position to un-latch the second member and the first member;
a compression control device attached to one of the first member and the second member and operable to engage the other of the first member and the second member, or the compliant member;
wherein the compression control device is moveable between a first position operable to allow compression of the compliant member into a first compressive state, and a second position operable to allow compression of the compliant member into a second compressive state when the first member and the second member are latched together by the latch system;
wherein the compression control device is separate from the latch system, such that movement of the compression control device from the first position into the second position and from the second position into the first position is separate from and independent of movement of the latch system between the engaged position and the disengaged position.

2. The closure system set forth in claim 1 wherein the compression control device mechanically connects the first member and the second member, and provides a substantially unyielding connection between the first member and the second member, when the compression control device is disposed in the second position.

3. The closure system set forth in claim 2 wherein the compression control device provides a direct load path between the first member and the second member when disposed in the second position to transfer a load applied to the second member to the first member.

4. The closure system set forth in claim 3 wherein compression of the compliant member in the second compressive state is substantially fixed, and not dependent upon a magnitude of the load applied to the second member, when the compression control device is disposed in the second position.

5. The closure system set forth in claim 3 wherein the compression control device includes a cam surface, and one of the first member and the second member include a cam follower for engagement with the cam surface.

6. The closure system set forth in claim 5 wherein the compression control device is linearly moveable between the first position and the second position.

7. The closure system set forth in claim 5 wherein the compression control device is rotatably moveable about an axis that is generally parallel to the cam surface, between the first position and the second position, such that the cam surface rotates about the axis and into engagement with the cam follower.

8. The closure system set forth in claim 5 wherein the compression control device includes a magnetorheological fluid coupling.

9. The closure system set forth in claim 2 wherein a load applied to the second member is transferred to the first member through the compliant member, when the compression control device is disposed in the first position.

10. The closure system set forth in claim 9 wherein compression of the compliant member in the first compressive state is dependent upon a magnitude of the load applied to the second member, when the compression control device is disposed in the first position.

11. The closure system set forth in claim 1 wherein the compliant member is a seal operable to seal between the first member and the second member.

12. The closure system set forth in claim 1 wherein the compliant member is a bumper operable to absorb energy transferred between the first member and the second member.

13. The closure system set forth in claim 1 further comprising an actuator coupled to the compression control device and operable to move the compression control device between the first position and the second position.

14. A vehicle comprising:
a first member;
a second member moveable relative to the first member between an open position and a closed position;
a compliant member attached to one of the first member and the second member, and compressible between the first member and the second member;
a latch system moveable between an engaged position operable to selectively latch the second member and the first member together, and a disengaged position to un-latch the second member and the first member;
a compression control device attached to one of the first member and the second member and operable to engage the other of the first member and the second member, or the compliant member;
wherein the compression control device includes a cam surface, and the other of the first member and the second member includes a cam follower for engagement with the cam surface; and
an actuator coupled to the compression control device for moving the compression control device between a first position in which the cam follower is not engaged with the cam surface to allow compression of the compliant member into a first compressive state, and a second position in which the cam follower is engaged with the cam surface to allow compression of the compliant member into a second compressive state when the first member and the second member are latched together;
wherein the compression control device is separate from the latch system, such that movement of the compression control device from the first position into the second position and from the second position into the first position is separate from and independent of movement of the latch system between the engaged position and the disengaged position.

15. The vehicle set forth in claim 14 wherein the first member is a body of the vehicle, the second member is a decklid of the vehicle, and the compliant member is a seal disposed between the decklid and the body.

16. The vehicle set forth in claim 14 wherein the first member is a latch striker attached to a body of the vehicle, the second member is a door of the vehicle, and the compliant member is a bumper attached to the door for absorbing energy transfer between the door and the striker.

17. The vehicle set forth in claim 14 wherein:
the compression control device mechanically connects the first member and the second member, and provides a substantially unyielding connection between the first member and the second member, when the compression control device is disposed in the second position;
the compression control device provides a direct load path through the mechanical connection between the first member and the second member to transfer a load applied to the second member to the first member through the compression control device, when disposed in the second position, to bypass load transfer through the compliant member; and wherein
compression of the compliant member in the second compressive state is substantially fixed, and not dependent upon a magnitude of the load applied to the second member, when the compression control device is disposed in the second position.

18. The vehicle set forth in claim 14 wherein:
a load applied to the second member is transferred to the first member through the compliant member, when the compression control device is disposed in the first position; and
wherein compression of the compliant member in the first compressive state is dependent upon a magnitude of the load applied to the second member, when the compression control device is disposed in the first position.

19. The vehicle set forth in claim 14 wherein the actuator rotates the compression control device about an axis that is generally parallel to the cam surface, to move the compression control device between the first position and the second positon.

* * * * *